United States Patent [19]

Yamamura

[11] 4,068,851

[45] Jan. 17, 1978

[54] AUDIO/VIDEO DISC PLAYBACK APPARATUS WITH MEANS FOR CORRECTLY POSITIONING THE DISC RELATIVE TO A REFERENCE LEVEL

[75] Inventor: Takashi Yamamura, Yokohama, Japan

[73] Assignee: Victor Company of Japan, Limited, Japan

[21] Appl. No.: 760,984

[22] Filed: Jan. 21, 1977

[30] Foreign Application Priority Data

Jan. 23, 1976 Japan .................................. 51-6656

[51] Int. Cl.² ............................................. G11B 3/60
[52] U.S. Cl. .................................... 274/39 A; 360/97; 358/128; 346/137
[58] Field of Search ............... 274/9 B, 39 A; 360/97; 358/128; 179/100.3 V; 346/137

[56] References Cited

U.S. PATENT DOCUMENTS

| | | | |
|---|---|---|---|
| 3,135,949 | 6/1964 | Whyte | 360/97 |
| 3,587,074 | 6/1971 | Angle | 346/137 X |
| 3,658,347 | 4/1972 | Cheeseboro | 274/9 B |
| 3,691,542 | 9/1972 | Gabor | 360/97 |
| 3,898,814 | 8/1975 | Chou et al. | 274/9 B X |

*Primary Examiner*—Charles E. Phillips
*Attorney, Agent, or Firm*—Robert E. Burns; Emmanuel J. Lobato; Bruce L. Adams

[57] ABSTRACT

Audio/video disc playback apparatus includes a housing, a cover hinged to the housing, a rotor disc mounted in the housing and driven by a motor, and a pressure disc rotatably mounted underside of the cover for providing pressure contact with the rotor disc by the weight of the cover with an audio/video disc held therebetween. The pressure disc is loosely coupled to a mounting attached to the cover by means of a suspension which permits it to disengage from the mounting when the pressure disc comes to contact with the rotor disc as the cover is brought to the closed position so that the pressure disc is self-aligned to the axis of the rotor disc.

11 Claims, 6 Drawing Figures

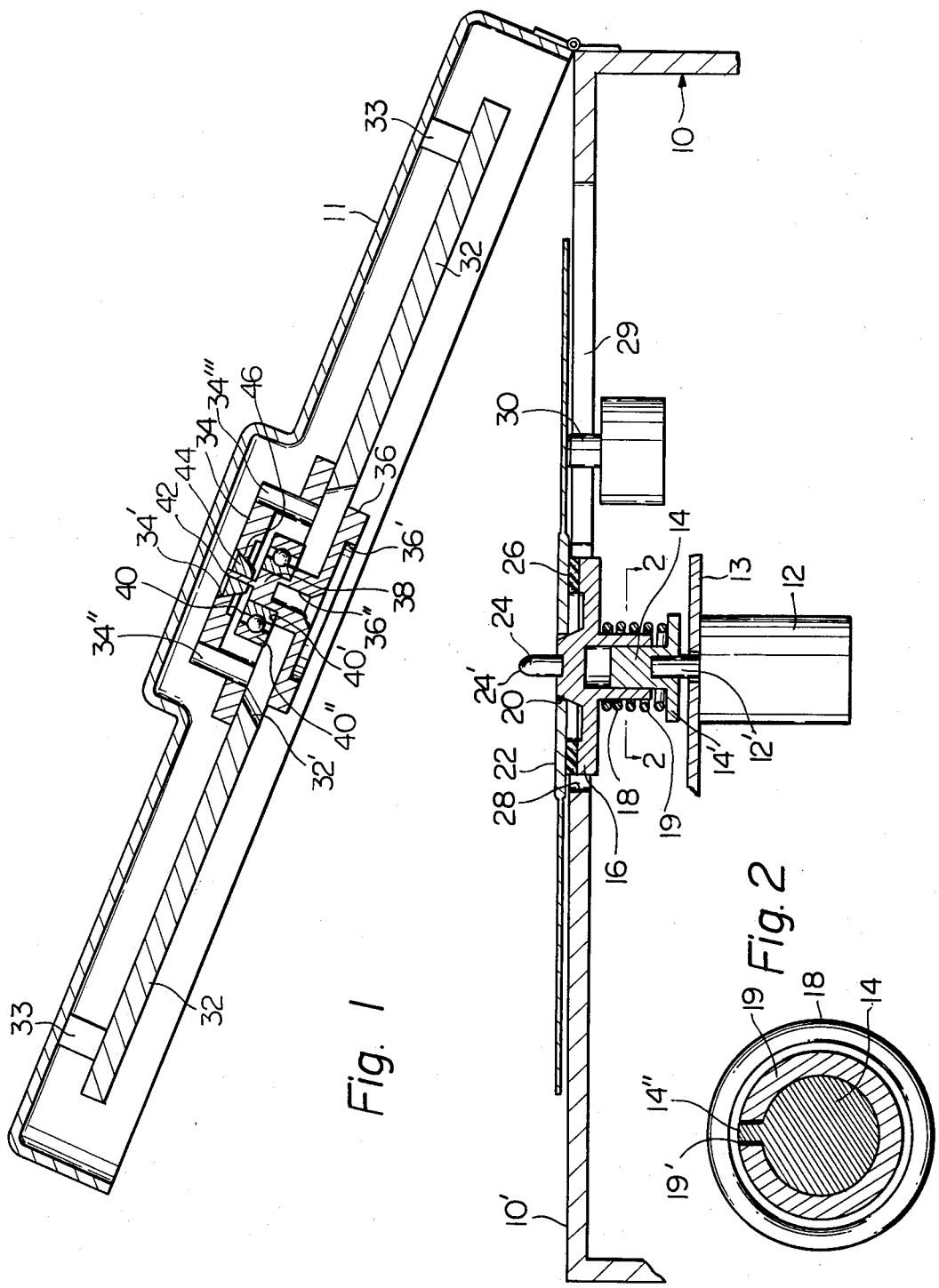

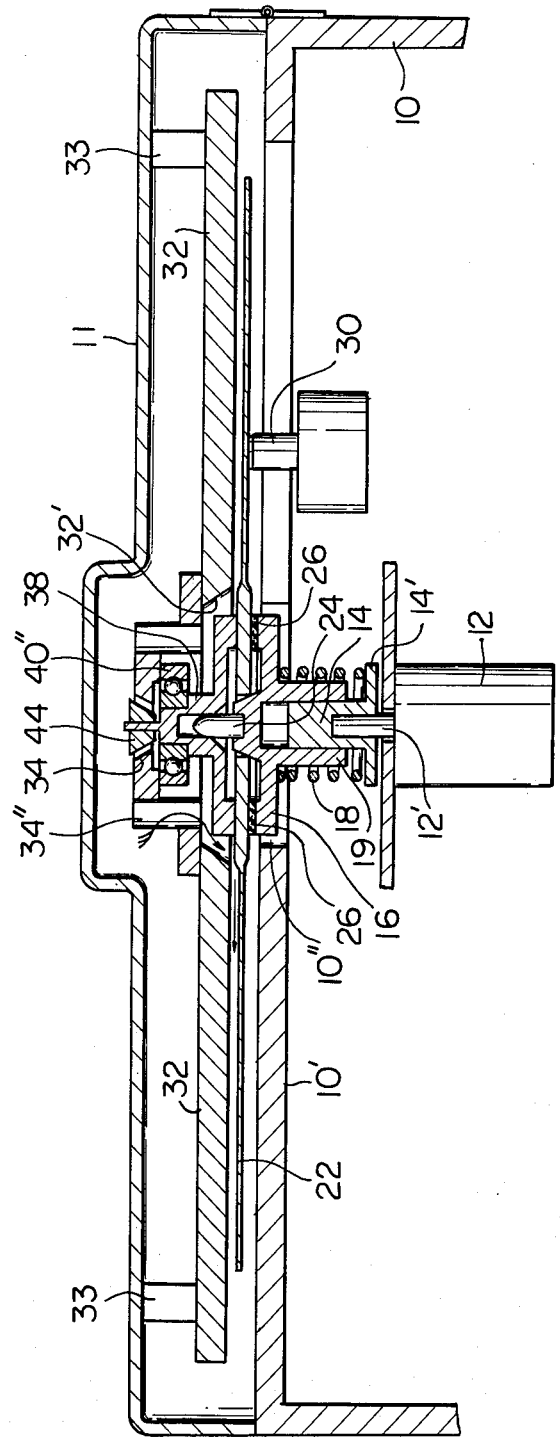

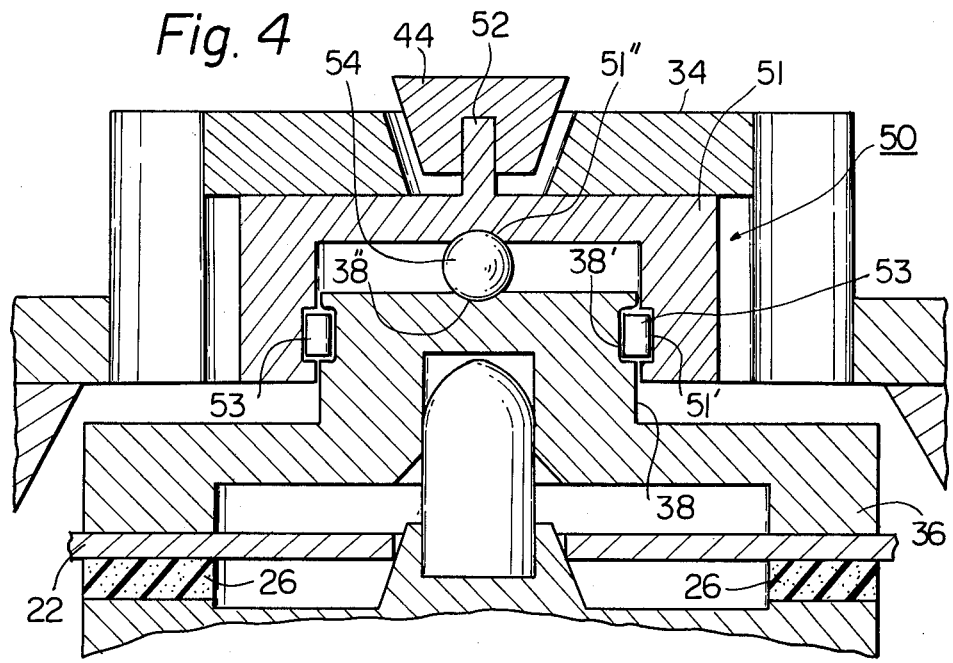
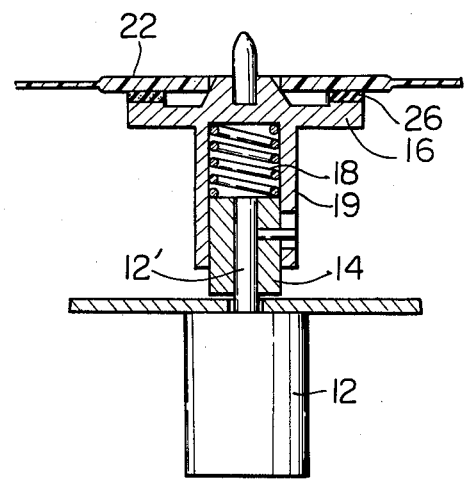
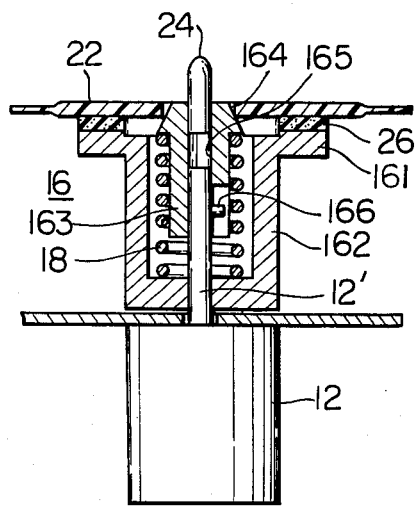

AUDIO/VIDEO DISC PLAYBACK APPARATUS WITH MEANS FOR CORRECTLY POSITIONING THE DISC RELATIVE TO A REFERENCE LEVEL

FIELD OF THE INVENTION

The present invention relates to audio/video disc playback apparatus, and particularly it relates to such apparatus in which the audio/video disc is held between two opposing discs in precisely parallel relationship to a stationary stabilizer disc.

BACKGROUND OF THE INVENTION

The known video disc playback apparatus comprises a rotor disc on which a video disc is mounted and a pressure disc rotatably mounted underside of a cover hinged to the housing of the apparatus. When the cover is brought to the closed position with respect to the housing, the pressure disc is coaxially alinged with the rotor disc and engages the record disc and presses it against the rotor disc by the weight of the cover so that during playback all of these components of the apparatus act as a composite rotary unit and jointly rotate as the rotor disc is driven by a motor.

However, in the prior art apparatus, the center of rotation of the pressure disc is fixed at a corresponding point of the cover and thus a slight displacement of this point due to some wear of the hinge will result in misalignment of the two pressing discs. Therefore, the video disc is likely to be tilted with respect to the surface of the stabilizer disc, and objectionable consequences will result during rotation.

SUMMARY OF THE INVENTION

An object of the present invention is therefore to provide an improved audio/video disc playback apparatus in which the pressure disc is loosely coupled with a mounting attached to the cover such that when the cover is in the open position the pressure disc is suspended from the mounting and when the cover is brought to the closed position the pressure disc is decoupled from the mounting and self-aligned with the rotor disc, so that the video disc is held precisely parallel with the stabilizer disc.

Another object of the invention is to provide an improved audio/video disc playback apparatus in which the rotor disc having an upwardly tapered portion is rotatably and axially movably coupled with a drive shaft and carried on a compression spring that permits the tapered portion of the rotor disc to snugly engage the disc's center pivot hole when the cover is in the closed position, regardless of its hole size and axial dimension that vary from one video disc to another due to variations of manufacturing accuracy.

BRIEF DESCRIPTION OF THE DRAWINGS

These and other objects, features and advantages of the invention will be understood from the following description taken in conjunction with the accompanying drawings, in which:

FIG. 1 is a cross-sectional view in elevation of an embodiment of the invention with the cover shown in its open position;

FIG. 2 is a cross-sectional view taken along lines 2—2 of FIG. 1;

FIG. 3 is a cross-sectional view of the embodiment of FIG. 1 with the cover in its closed position;

FIG. 4 is an enlarged cross-sectional view in part of the apparatus in a modified form of the invention; and FIGS. 5 and 6 are further modifications of the invention.

DESCRIPTION OF THE PREFERRED EMBODIMENTS

The audio/video disc playback apparatus of FIG. 1 comprises a housing 10 formed integrally with a horizontal plate or deck 10', and a cover 11 hinged to the housing and shown tilted with respect to the deck 10' in an open position. A motor 12 is mounted underside of a chassis 13 which is in turn secured to the housing 10. The shaft 12' of the motor extends through the chassis 13, a metal bushing 14 being secured to the end of the shaft 12'. A rotor disc 16 is carried on an end of a compression spring 18 mounted on a spring seat or flanged portion 14' of the bushing 14. Downwardly projecting from the rotor disc 16 is a hollow cylinder 19 in which the bushing 14 is received. As seen from FIG. 2, the bushing 14 is provided with a lug 14" which projects outwardly into a vertical slit 19' provided on the wall of the hollow cylinder 19 to permit the vertical reciprocal movement of the rotor disc relative to the chassis 13 and the unitary rotation thereof with the drive shaft 12'. The rotor disc 16 is further formed to provide an upwardly tapered portion 20 which engages the center pivot hole of a video disc 22. A guide shaft 24 formed with a rounded camming surface 24' is mounted on the top of the tapered portion 20.

On the upper circumferential edge of the disc 16 is adhesively bonded an annular pad 26 of resilient material such as foam rubber on which the inner thick zone of the video disc 22 is seated as shown.

The deck 10' is provided with a circular opening 28 in which the rotor disc 16 is positioned and a slot 29 which runs transverse to the disc's record tracks to allow a pick-up head 30 to gain access to the lower side of the disc's information-carrying zone. The pickup head 30 is suitably carried on a mechanism which reciprocates the head across the slot 29 in the well known manner.

On the underside of the cover 11 is mounted with spacers 33 a stationary stabilizer disc 32 equal to or larger in diameter than the video disc 22. The stabilizer disc 32 has a precisely flat plane on its lower side and is provided with a circular opening 32'. Over the peripheral edge of the opening 32' is secured a mounting 34 of generally inverted-U shaped cross-section. The mounting 34 is provided with an opening 34' having a downwardly decreasing diameter on the top wall thereof.

Suspended from the opening 34' of the mounting is a pressure disc 35 which is formed with an upwardly extending shank 38, the shank 38 being offset at its upper portion to be fitted with the inner race 40' of a ball bearing 40 and provided with a prong 42. To the prong 42 is secured a downwardly tapered member 44 whose side surface is complementary to the bevelled wall of the opening 34' so that the former is snugly fitted into the latter and the pressure disc 36 is suspended from the mounting 34 when the cover 11 is in the open position as shown.

The top plate of mounting 34 has its underside shaped to provide a recess 46 in order that the outer race 40" of the ball bearing engages the mounting 34 when the cover 11 is brought to closed position as illustrated in FIG. 3.

The pressure disc 36 has its lower side shaped to provide a recess 36' and a countersunk bore 36" which extends upwardly into the shank 38.

Bores 34" are provided along the vertical wall of the mounting 34 to admit a flow of air into the space below the stabilizer disc 32.

The operation of the embodiment of FIG. 1 will be understood with reference to FIG. 3. When the cover 11 is moved to the closed position, the bevelled edge portion of the countersunk bore 36" coacts the camming surface 24' of the guide post 24 until the latter is received into the former, while the tapered suspending member 44 of the pressure disc is allowed to disengage from contact with the bevelled surface of the opening 34' of the mounting 34 so that the center axis of the pressure disc 36 is self-aligned with the center axis of the guide post 24 regardless of whether or not the center axis of opening 34' is exactly aligned with the guide 24. Therefore, the pressure disc 36 is rotatable.

When the cover 11 comes to the fully closed position, the outer race 40" of the ball bearing engages the underside of the top wall of mounting 34 to give a downward pressure to the video disc 22 against the rotor disc. Since the rotor disc is upwardly urged by compression spring 18 along its axis of rotation, the tapered portion 20 comes into close engagement with the center pivot hole of the video disc 22 while compressing the resilient pad 26 even though its hole size and axial dimension vary from one disc to another due to variations of manufacturing accuracy. The pad is thus compressed to the extent proportional to the disc's hole size.

When the motor 12 is energized, the rotor disc 16, pressure disc 36 and video disc 22 are all rotated as a composite unit. The rotation of the video disc 22 then produces a surface effect that tends to drag a mass of air in the space between the stationary stabilizer disc 32 and the video disc 22 in the directin of rotation. Since the circumferential speed of a given track of the video disc is higher than on inner tracks there occurs an outwardly decreasing pressure between the inner and outer tracks. This pressure difference will cause a flow of air to be admitted through the vertical hole 34" as indicated by the arrow in FIG. 3 and the opening 32' into the space between the stabilizer 32 and video disc 22. Thus, a laminar stream of air flows from the inner to outer sides of the record disc and as a result an equal gap is maintained between the video disc 22 and the stabilizer disc 32.

It will be appreciated that even though there is a difference in thickness from one video disc to another arising from the production process, the video disc 22 is held under pressure between the two opposing members 16 and 36 so that equal spacing is consistently ensured between the video disc and the stabilizer disc regardless of the varying thickness of the former.

A modification of FIG. 1 is illustrated in FIG. 4 in which instead of fixing the conventional ball bearing 40, the shank 38 of the pressure disc 36 is formed with an annular groove 38' on its outer side wall and a part-spherical recess 38" on its upper end. The shank 38, in this instance, acts as an inner race of a roller bearing 50 of which the outer race is constituted by a hollow cylindrical member 51 of generally inverted-U shaped cross-section. The outer member 51 includes an annular groove 51' formed on its inner wall, a part-spherical recess 51" formed on its inner top wall opposite to the counterpart of the inner race 38, and a prong 52 on its outer top wall to be fitted with the suspending member 44. A plurality of rollers 53 is disposed in the space between the grooves 38' and 51' of inner and outer members of the roller bearing, respectively. A ball 54 is seated between the spherical recesses 38" and 51" to transmit the pressure exerted thereon to the pressure disc 36 and at the same time it provides a pivot point for the rotating pressure disc 36.

The top wall of the outer race 51 serves as an area to be in contact with the mounting 34 when the cover 11 is in the closed position as shown in FIG. 4 in order to provide increased frictional engagement therewith. The rollers 53 provide reduced frictional, axial coupling between the inner and outer races.

A further modification of FIG. 1 is illustrated in FIG. 5 in which instead of mounting the compression spring 18 around the outer wall of the cylinder 19 of the rotor disc 16, this compression spring is disposed inside of the cylinder and the flange portion 14' is dispensed with.

Since the degree of coupling between the tapered portion 20 and the disc's center hole is dependent upon the capability of the pad 26 to compress under pressure, there exists a possibility that the tapered portion does not engage the hole, with the pad being compressed to a maximum in case where the hole size is so large.

In the modification of FIG. 1 as seen in FIG. 6, the rotor disc 16 is constituted by an outer member 161 formed with a cylinder 162 secured to the motor shaft 12' for rotation therewith, and an inner member 163 formed with an upwardly tapered portion 164 and carried on the compression spring 18 in the cylinder 162. The guide shaft 24 is secured to the tapered portion 164 coaxial with the motor shaft 12'. The shaft 12' is slidably received in the bore 165 of the inner member 163 as well as rotatably coupled with the inner member 163 by means of a lug 166 secured to the shaft 12' in a manner identical to that shown and described with reference to FIG. 2. In operation, the closure of cover 11 presses the video disc 22 against the resilient padding 26 of the rotor disc 16 and presses the edge of the center hole of the disc 22 against the surface of the tapered portion 164, so that the resilient padding 26 and the inner member 163 are simultaneously moved downward.

Since the tapered portion 164 is upwardly urged independently of the rotor disc proper by means of the compression spring 18, tapered portion is capable of engagement with the disc's center hole even when the pad is compressed to the maximum.

What is claimed is:
1. An audio-video disc playback apparatus, comprising:
   a housing;
   a cover hinged to said housing and rotatable between open and closed positions relative to said housing;
   a rotary drive shaft rotatably mounted in said housing;
   a rotor disc for mounting an audio-video disc and having a tapered portion for engagement with the center hole of the audio-video disc;
   a stationary disc having a diameter equal to or greater than the diameter of said audio-video disc and mounted on the under side of the cover and having an opening at the center thereof;
   a pressure disc;
   one of the rotor and pressure discs having a guide shaft and the other of the rotor and pressure discs being provided with a bore for receiving said guide shaft when the cover is in the closed position;

a bearing having an inner race coupled to the pressure disc for rotation therewith and an outer race;

means for mounting the pressure disc in the opening of the stationary disc when the cover is in the closed position; and means engageable with the mounting means for suspending the pressure disc from said mounting means when the cover is in the open position and disengageable from the mounting means for enabling said guide shaft to be received in said bore to coaxially align the rotor disc and the pressure disc when the cover is in the closed position while engaging the outer race of the bearing with the mounting means so that the audio-video disc is under pressure between the pressure disc and the rotor disc.

2. An audio-video disc playback apparatus as claimed in claim 1, further comprising means for rotatably and coaxially movably coupling the rotor disc with the rotary drive shaft and means for axially biasing the rotor disc in a direction opposite to said drive shaft.

3. An audio-video disc playback apparatus as claimed in claim 2, further comprising a resilient pad on the surface of the rotor disc.

4. An audio-video disc playback apparatus as claimed in claim 2, wherein said rotor disc is formed with a downwardly extending hollow cylinder in which said rotary drive shaft is received, one of the rotary drive shaft and the hollow cylinder being provided with a lug and the other of the rotary drive shaft and the hollow cylinder being provided with an axial slot to receive said lug therein so that hollow cylinder is rotatably and axially movably coupled with the rotary drive shaft.

5. An audio-video disc playback apparatus as claimed in claim 4, wherein said rotary drive shaft is formed with a flange, and wherein said biasing means comprises a compression spring mounted between the lower side of the rotor disc and the flange of the rotary drive shaft and disposed around the outer wall of the hollow cylinder.

6. An audio-video playback apparatus as claimed in claim 3, wherein said biasing means comrises a compression spring disposed in the space formed by the inner wall of the hollow cylinder and an end of the rotary drive shaft.

7. An audio-video disc playback apparatus as claimed in claim 2, wherein said rotor disc is formed with a downwardly extending outer hollow cylinder coaxially coupled with the rotary drive shaft for rotation therewith and an inner hollow cylinder for receiving the rotary drive shaft therethrough, one of the rotary drive shaft and the inner hollow cylinder being provided with a lug and the other of the rotary drive shaft and the inner hollow cylinder being provided with an axial slot for receiving said lug so that the inner hollow cylinder is rotatably and axially movably coupled with the rotary drive shaft, and wherein said tapered portion of the rotor disc disc for engaging the hole of the audio-video disc is formed at the upper end of the inner hollow cylinder and said biasing means comprises a compression spring mounted in the space between the inner and outer hollow cylinders, the inner hollow cylinder carried on one end of the compression spring.

8. An audio-video disc playback apparatus as claimed in claim 1, wherein said means for mounting the pressure disc comprises a generally inverted-U shaped cross-sectional member having an opening of downwardly decreasing acros-sectional area through the top wall thereof, and wherein said means for suspending the pressure disc comprises a downwardly tapered member received in the opening of the inverted-U shaped cross-sectional member when the cover is in the open position and means for connecting the downwardly tapered member to the pressure disc in coaxial alignment therebetween with a spacing between the top wall of the inverted-U shaped member and the outer race of the bearing so that when the cover is in the closed position the downwardly tapered member is disengaged from the opening of the inverted-U shaped member.

9. An audio-video disc playback apparatus as claimed in claim 8, wherein the pressure disc is formed with a cylindrical shank extending axially from the plane of the pressure disc and coupled to the inner race of the bearing, said cylindrical shank being connected at one end to said downwardly tapered member.

10. An audio-video disc playback apparatus as claimed in claim 8, wherein the pressure disc is formed with a cylindrical shank having a part-spherical recess, and wherein the outer race of the bearing is formed of an inverted-U shaped cross-sectional member axially coupled with the cylindrical shank of the pressure disc and having a part-spherical recess in the top wall thereof, and wherein the bearing includes a ball received in the part-spherical recesses of the shank and the inverted-U shaped cross-sectional outer race.

11. An audio-video disc playback apparatus as claimed in claim 8, wherein the inverted-U shaped cross-sectional mounting member is provided with a plurality of openings to communicate the space between the audio-video disc and the stationary disc with the space outside of the mounting means to allow a flow of air to be admitted through said openings into the first-mentioned space when the cover is in the closed position.

* * * * *